Oct. 11, 1949.  F. V. COLLINS  2,484,075
TUBE-FORMING APPARATUS
Filed Feb. 27, 1947
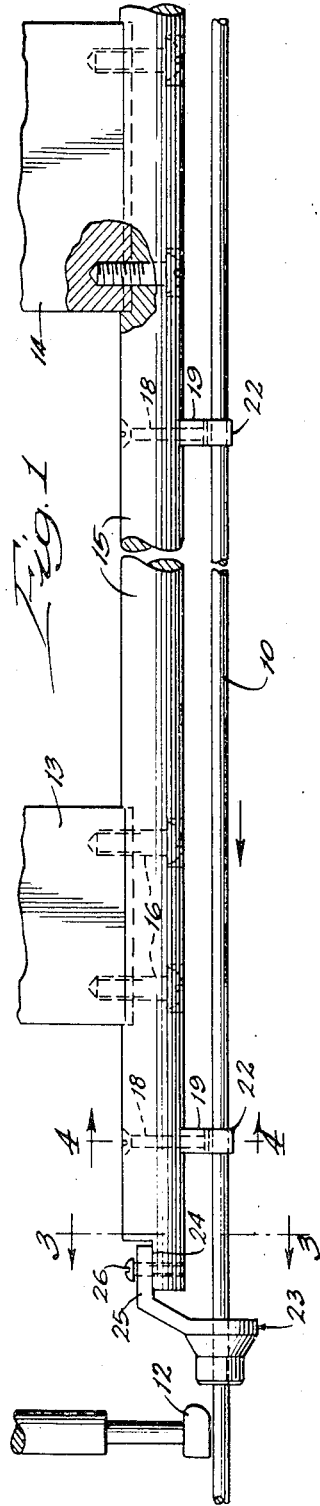
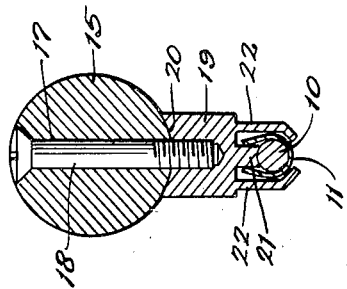
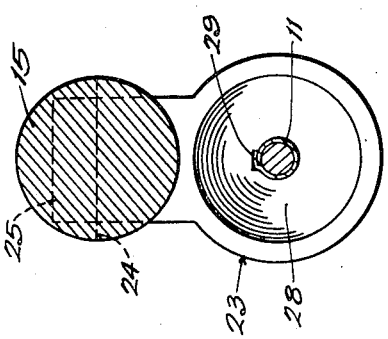
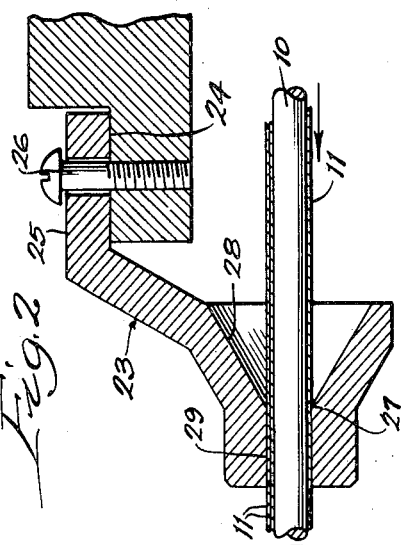
Inventor:
Fred V. Collins,
By Dawson, Booth and Spangenberg,
Attorneys.

Patented Oct. 11, 1949

2,484,075

UNITED STATES PATENT OFFICE 2,484,075

TUBE-FORMING APPARATUS

Fred V. Collins, Des Plaines, Ill., assignor to William F. Stahl, Chicago, Ill.

Application February 27, 1947, Serial No. 731,263

7 Claims. (Cl. 154—42)

This invention relates to tube-forming apparatus and is particularly useful in the forming of tubes from plastic sheets or other fusible flat stock. The invention constitutes an improvement upon my co-pending application, Serial No. 651,642 for Tube forming apparatus and method.

In the forming of tubes from plastic material such as cellulose acetate, vinyl acetate, and similar materials upon mandrels, it is found that in actual practice, the mandrel employed is limited in use by reason of its diameter and that a number of mandrels must be substituted in the machine to provide tubes of different diameters as they are needed. Such changes have heretofore required a major disassembly of the machine and often in the change of mandrels, poor results have been obtained because of an inaccuracy in the positioning of the substituted mandrel.

An object of the present invention is to provide a machine structure and a mandrel assembly whereby ready substitution of mandrels can be accomplished with slight change in the machine parts, while, at the same time, automatically positioning the new mandrel accurately in the machine. Yet another object is to provide a mandrel and support assembly whereby changes in the tube support mandrel can be effected readily, while also providing a floating support for the tube-forming guide. Yet another object is to provide an extremely compact structure in which a mandrel is suspended in a releasable manner from a suspension bar, while, at the same time, providing a releasable support for a floating guide about the mandrel. Other specific objects and advantages will appear as the specification proceeds.

The invention is illustrated, in a preferred embodiment, by the accompanying drawing, in which—

Figure 1 is a broken side view in elevation of a support structure and tube-forming mandrel; Fig. 2, an enlarged longitudinal sectional view of the floating guide employed for completing the folding of the tube; Fig. 3, an enlarged detail sectional view, the section being taken as indicated at line 3 of Fig. 1; and, Fig. 4, an enlarged detail sectional view, the section being taken as indicated at line 4 of Fig. 1.

The present application constitutes an improvement upon the structure shown in my co-pending application, Serial No. 651,642, in which a flat sheet of plastic material is drawn below a mandrel and a guide member causes the sheet to fold about the mandrel and form a tube. Then the edges of the sheet are brought into overlapping relation and subjected to the action of high frequency radio waves to fuse such edge portions of the sheet, thus forming a completed tube. Rollers engage the tube after it has been formed and draw it forwardly so that the flat sheet is thus being continually formed about the mandrel, fused in tubular form, and delivered from a forward end of the mandrel.

The supporting of the mandrel has always constituted a problem and it is particularly a problem when, by reason of the demand for different size tubes, the mandrels must be changed.

In the structure shown in the drawings, 10 designates a mandrel about which the plastic sheet 11 is to be drawn, and 12 designates an electronic foot supplied with energy from a radio wave generator so that the plastic sheet, after being formed into tubular shape, is fused to unite its overlapping edge portions. Since the electronic foot is a well-known structure, it is believed that further description is not required here.

In the illustration, frame members 13 and 14 of the machine support a suspension bar 15 by means of screws 16, as illustrated in Fig. 1. The suspension bar 15 extends longitudinally of and above the mandrel 10. At spaced intervals, the suspension bar 15 is provided with vertical holes 17 through which extend the screws 18. The screws 18, as shown best in Fig. 4, have their lower threaded ends engaging a bracket block 19. The upper end of each block 19 is arcuate, as indicated at 20, so as to receive a portion of the suspension bar 15. The lower end of the block 19 is provided with a depending arm 21 having an arcuate lower surface bearing against the arcuate surface of the mandrel 10. Silver solder, or any other suitable material or means, may be used for securing the arm 21 to the mandrel 10. The block 19 is also provided with a pair of depending, spaced webs 22 which have inwardly turned lower portions. The webs 22 thus provide a chamber about the mandrel 10 and arm 21 so as to receive and guide the plastic sheet with its free edges extending upwardly and inwardly as shown in Fig. 4.

At the forward end of the bar 15 there is supported a floating guide 23. In the illustration given, the bar 15 is cut away at its forward end to provide a shoulder 24. The floating guide 23 has a horizontal arm 25 at its top and is apertured to receive the bolt 26. The lower portion of the bolt 26 is threaded to engage a threaded recess in the bar 15.

The guide member 23 is provided centrally with an opening 27 adapted to receive the mandrel 10 and the plastic sheet 11 and at its rear is provided with inclined walls 28 which serve to guide the free edge portions of the plastic sheet 11 into overlapping relation, as indicated best in Figs. 2 and 3. If desired, the upper end of the member 23 may be provided with a vertical channel 29 adapted to receive the overlapping edges, as indicated in Fig. 3.

Operation

In the operation of the device, a sheet 11 of plastic material is drawn by hand or by rollers, as indicated in my co-pending application, Serial No. 651,642 for Tube forming apparatus and method. The sheet is turned around the mandrel 10 and the forward edges are threaded through the guide webs 22, as shown best in Fig. 4. When the folded sheet 11 reaches the floating guide 23, the upper edges thereof are folded into overlapping relation, as indicated in Fig. 2. The overlapping edges are thus directly exposed to the action of high frequency radio waves from the electronic foot 12 and such edges thus fuse to form an integral tube.

Should it be necessary to substitute a new mandrel of a different diameter, this is accomplished readily by unscrewing the screws 18 and the bolt 26. The blocks 19 and the floating guide 23 are thus released and the mandrel 10 may be removed. A mandrel of a different size received within a different guide 23 may be readily placed in position by a reversal of the steps just described. The screws 18 will be tightened to secure the new blocks 19, carrying the new mandrel, and the floating guide receiving the new mandrel may be locked in position by extending the bolt 26 therethrough and securing it to the bar 15. The apparatus also permits removal of the suspension bar 15 and all of the parts carried thereby by the unscrewing of the bolts 16.

The blocks 19 serve a dual purpose in that they provide means for suspending the mandrel upon the bar 15, while, at the same time, providing guides around the mandrel for receiving the folded plastic sheet.

While in the foregoing specification, I have set forth structure in great detail for the purpose of illustrating one embodiment of the invention, it will be understood that such details may be varied widely by those skilled in the art without departing from the spirit of my invention.

I claim:

1. In tube-forming apparatus, a mandrel about which a plastic sheet is adapted to be drawn, a frame, a suspension bar carried by said frame and extending longitudinally of said mandrel, spaced arms carried by said bar and secured to said mandrel, said arms providing guides about said mandrel to maintain a plastic sheet in folded relation thereabout, a guide carried by the forward end of said bar and freely receiving said mandrel, said guide having inwardly inclined walls for completing the folding of said sheet into tubular form, and means positioned near the adjacent edge portions of said tube for subjecting the same to high frequency radio waves to fuse the same.

2. In tube-forming apparatus, a mandrel about which a plastic strip is adapted to be drawn, a suspension bar supported to extend longitudinally of and over said mandrel, spaced arms releasably carried by said bar and secured to said mandrel, and a floating guide carried by the forward end of said bar and freely encircling the mandrel, and means positioned over the adjacent edge portions of said tube for subjecting the same to high frequency radio waves to fuse said edge portions.

3. In tube-forming apparatus, a mandrel about which a plastic strip is adapted to be folded, a suspension bar supported to extend longitudinally of and above said mandrel, a plurality of depending arms carried by said bar and providing releasable supporting means for said mandrel, guides supported by said bar and about said mandrel for confining a plastic sheet in folded relation about said mandrel, a floating guide supporting to freely encircle the mandrel, said guide having inwardly inclined walls for completing the folding of said sheet into tubular form, and means positioned over the adjacent edge portions of said tube for subjecting the same to high frequency radio waves to fuse the same.

4. In tube-forming apparatus, a mandrel about which a plastic strip is adapted to be folded, a suspension bar supported to extend longitudinally of and above said mandrel, a plurality of depending arms carried by said bar and providing releasable supporting means for said mandrel, guides supported by said bar and about said mandrel for confining a plastic sheet in folded relation about said mandrel, a floating guide supporting to freely encircle the mandrel, said guide having inwardly inclined walls for completing the folding of said sheet into tubular form, and means positioned over the adjacent edge portions of said tube for subjecting the same to high frequency radio waves to fuse the same, said floating guide being releasably carried by the forward end of said bar.

5. In tube-forming apparatus, a frame, a suspension bar carried by said frame and equipped with depending arms, a mandrel supported by said depending arms, means carried by said arms for providing a guide, open at its bottom, about said mandrel, and a detachable floating guide supported by said bar and providing a ring freely receiving said bar, said ring having a recess in its upper portion for receiving overlapping portions of the plastic strip, and means for subjecting the overlapping portions of said plastic sheet to the action of high frequency radio waves to fuse said overlapping edge portions.

6. In tube-forming apparatus, a frame, a suspension bar carried by said frame and equipped with depending arms, a mandrel supported by said depending arms, means carried by said arms for providing a guide, open at its bottom, about said mandrel, and a detachable floating guide supported by said bar and providing a ring freely receiving said bar, said ring having a recess in its upper portion for receiving overlapping portions of the plastic strip, and means for subjecting the overlapping portions of said plastic sheet to the action of high frequency radio waves to fuse said overlapping edge portions, said last-mentioned means being supported adjacent the ring portion of said floating guide.

7. In tube-forming apparatus, a frame, a suspension bar carried by said frame and having a portion cut away at its forward end to provide a horizontal shoulder a plurality of arms depending from said suspension bar, a mandrel carried by said arms in releasable relation to said suspension bar, and a floating guide having a ring portion receiving said mandrel and having an upwardly extending arm provided with a horizontal portion resting upon said shoulder of the suspension bar and releasably secured thereto.

FRED V. COLLINS.

REFERENCES CITED

The following references are of record in the file of this patent:

UNITED STATES PATENTS

| Number | Name | Date |
| --- | --- | --- |
| 2,108,022 | Salemme | Feb. 8, 1938 |
| 2,125,758 | Waters | Aug. 2, 1938 |
| 2,256,506 | Wagner | Sept. 23, 1941 |
| 2,422,188 | Epstein | June 17, 1947 |

OTHER REFERENCES

Hoyler, An Electronic "Sewing Machine," Reprint from Aug. 1943 Electronics (7 pages).